J. F. GEISENDORFER.
ARMOR FOR AUTOMOBILE TIRES.
APPLICATION FILED JUNE 26, 1915.

1,173,502.

Patented Feb. 29, 1916.

WITNESSES:
B. M. Doolin
L. J. Forde.

INVENTOR
John F. Geisendorfer
BY Strong & Townsend
ATTORNEYS

UNITED STATES PATENT OFFICE.

JOHN F. GEISENDORFER, OF WEIMAR, CALIFORNIA.

ARMOR FOR AUTOMOBILE-TIRES.

1,173,502.  Specification of Letters Patent.  Patented Feb. 29, 1916.

Application filed June 26, 1915. Serial No. 36,562.

*To all whom it may concern:*

Be it known that I, JOHN F. GEISENDORFER, a citizen of the United States, residing at Weimar, in the county of Placer and State of California, have invented new and useful Improvements in Armor for Automobile-Tires, of which the following is a specification.

This invention relates to an armor for automobile tires, and has for its object to improve and simplify the construction and operation of a device of the character shown and described in my former application Ser. No. 788,723, filed September 8, 1913.

This invention contemplates the employment of a channel-shaped, circumferential protector, preferably of thin metal, adapted to receive the tread portion of the usual pneumatic tire, and having a central raised or inwardly extending portion upon its annulus for supporting the tire in a manner to increase its resiliency, said protector having formed upon its periphery a rim or shell portion upon which is vulcanized a rubber shoe forming the actual tread of the device.

A preferred and a modified form which my invention may assume is exemplified in the following description and illustrated in the accompanying drawings, in which—

Figure 1:
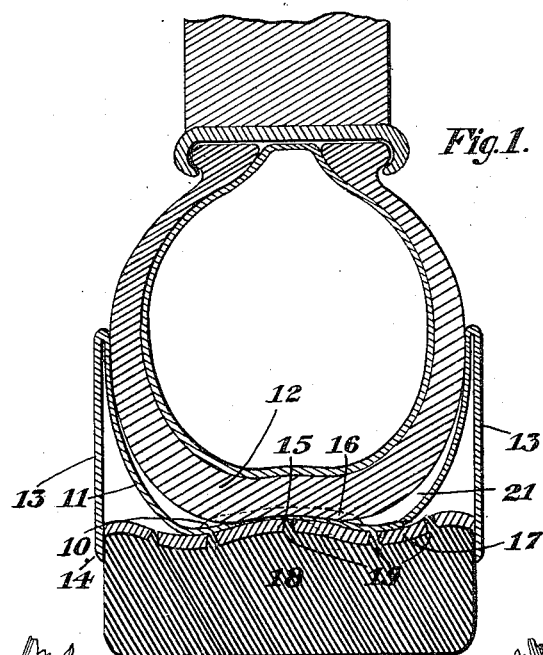
Figure 2:
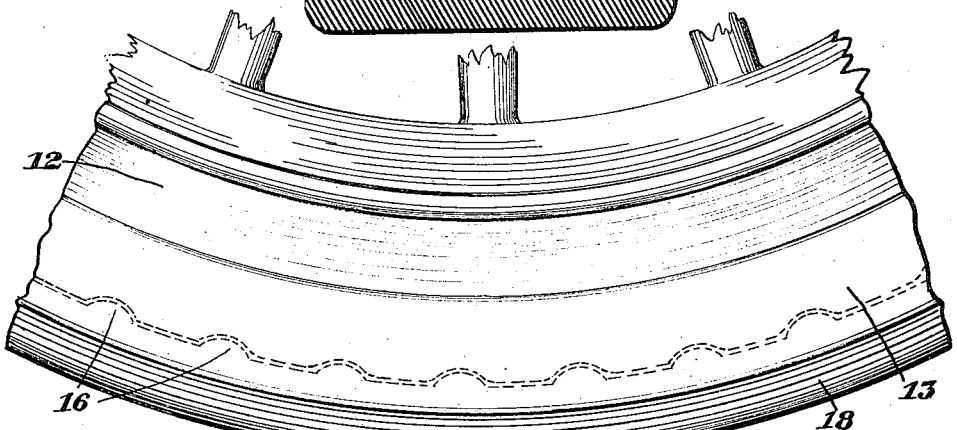
Figure 3:
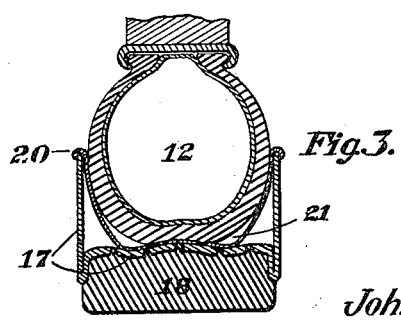

Figure 1 shows a cross section of an automobile tire embodying my invention. Fig. 2 shows a side elevation of a fragment of the same. Fig. 3 shows a view similar to Fig. 1, with a slightly modified arrangement of the parts of the device.

In the form of my invention illustrated in Figs. 1 and 2, I have provided a channel-shaped protector or casing, consisting of a base portion 10 and sides 11 circumferentially fitting the convex surface of a pneumatic tire 12, said protector having its lateral projecting ends bent and folded back to form supports 13, being shown as slightly spaced from the curved sides of the protector and terminating below or beyond the base of the channel to form the sides 14 of the peripheral shell or rim to be hereinafter described.

The base 10 is curved inwardly at its central portion to form an annular rib or convexity 15 upon which the convex periphery of the tire 12 rests. As shown in Fig. 2, the base of the channel is provided with transverse corrugations 16, by reason of which creeping of the protector on the tire is prevented. By the formation of the rib 15 a peripheral and exterior concaved seat is provided in the casing. A peripheral rim or band 17 is welded to the base of the channel and extends transversely between the supporting sides 13 to form a shell therewith for receiving a shoe or tread 18. In practice, I prefer to provide the rim 17 with a plurality of small openings 19, forming an irregular or roughened surface whereby rubber can be vulcanized thereon to form the shoe referred to.

As shown in Fig. 3, the supporting sides 13 are formed integral with the rim 17 and are spot welded to the channel-shaped casing at 20. This form is merely included to indicate the possibilities of varying the design and construction of my device and it is obvious that other changes than those referred to may be resorted to without departing from the spirit of my invention.

I wish to particularly point out the entire absence of bolts, screws, rivets, and the like in my device and the shape and arrangement of the parts whereby a highly improved armor is obtained at a minimum cost. By providing the circumferential rib 15 I add to the resiliency of the usual pneumatic casing by restricting its bearing surface. The metallic protector approaches more nearly a rectangular channel, in cross section, than does the tire itself and, therefore, considerable space is allowed at either side in the form of annular ducts 21 for the circulation of air around the tire. The sides 13 being spaced from the sides 11 form circumferential air pockets which prevent undue heating of the protector casing and also allow for a slight increase in the resiliency of the sides 11.

The inward curve of the base 10 is followed also by the rim 17 forming a rib for engaging in the peripheral seat provided by the formation of rib 15 and, therefore, the rubber shoe which is vulcanized to the latter has a greater depth at its central portion, at which point the maximum strains and wearing will occur. By reason of this increase in thickness of the central portion of the shoe longer wearing and more resiliency will result. A double thickness of metal produced by the base of the channel and the rim make possible the piercing of the latter to form openings for receiving the soft rubber in vulcanizing the shoe thereon. The convex form of the protector casing, in addition to the advantages already mentioned, affords a clean bearing surface for the tire at all times.

Having thus described my invention, what I claim and desire to secure by Letters Patent is—

1. In combination, a pneumatic tire and a protector therefor, said protector comprising a substantial, channel-shaped, metallic casing to receive the tire, a centrally arranged, inwardly projecting rib, formed by the base of the channel, engaging circumferentially with the tread of the tire to provide a convex support for the latter, and transverse corrugations formed on said base to prevent creeping of the protector on the tire.

2. A protector for automobile tires comprising a metallic, channel-shaped casing having its base curved inwardly to form a centrally arranged circumferential rib, the formation of said rib providing an exterior and peripheral concaved seat in the casing, supports at the sides of said casing projecting beyond the base thereof, a rim on the base of said casing forming with the projecting ends of said supports an annular shell, said supports being formed integrally with the adjacent part at one end and welded to the adjacent part at the other end, said rim being curved inwardly circumferentially to provide a rib to engage in the peripheral concaved seat in the base of the casing, and a shoe mounted on the rim in said shell.

3. A tire protector comprising a metallic casing of channel formation, the periphery of which is provided with inwardly extending transverse corrugations, a rim seating on the periphery of the casing and provided with a plurality of openings extending over the corrugations of the casing, and a rubber shoe vulcanized to the rim, the rubber entering the openings provided in the latter.

In testimony whereof I have hereunto set my hand in the presence of two subscribing witnesses.

JOHN F. GEISENDORFER.

Witnesses:
HENRY LOBNER,
I. D. KUENZLY.